United States Patent [19]

Haehner

[11] Patent Number: 5,126,527
[45] Date of Patent: Jun. 30, 1992

[54] HIGH TEMPERATURE SOLDER DEVICE FOR FLAT CABLES

[75] Inventor: Carl L. Haehner, Dayton, Md.

[73] Assignee: The United States of America as represented by the Administrator of the National Aeronautics and Space Administration, Washington, D.C.

[21] Appl. No.: 718,046

[22] Filed: Jun. 20, 1991

[51] Int. Cl.⁵ .............................................. B23K 1/00
[52] U.S. Cl. .............................. 219/85.15; 219/85.19
[58] Field of Search ............... 219/85.18, 85.21, 85.16, 219/85.19, 56, 56.1, 233, 85.15, 86.9, 161; 350/96.15; 228/46

[56] References Cited

U.S. PATENT DOCUMENTS

| | | | |
|---|---|---|---|
| 3,238,351 | 3/1966 | Hill | 219/56.1 |
| 3,393,288 | 7/1968 | Barstow et al. | 219/86.9 |
| 3,418,444 | 12/1968 | Ruehlmann | 219/113 |
| 3,478,190 | 11/1969 | Dawes | 219/86.9 |
| 3,552,630 | 1/1971 | Dean | 228/46 |
| 4,071,730 | 1/1978 | Bassler | 219/85.15 |
| 4,142,083 | 2/1979 | DuRocher | 219/161 |
| 4,220,845 | 9/1980 | Morreale | 219/243 |
| 4,339,651 | 7/1982 | Kraus | 219/85.15 |
| 4,396,819 | 8/1983 | Muchkin et al. | 219/56 |
| 4,854,659 | 8/1989 | Hamerslag et al. | 350/96.15 |
| 4,899,029 | 2/1990 | Kumagai | 219/56.1 |
| 5,050,036 | 9/1991 | Oudick et al. | 361/385 |

FOREIGN PATENT DOCUMENTS 556915 7/1975 U.S.S.R. .............................. 219/56.1

Primary Examiner—Geoffrey S. Evans
Attorney, Agent, or Firm—R. Dennis Marchat; Guy M. Miller; Paul S. Clohan, Jr.

[57] ABSTRACT

A High Temperature Solder Device for Flat Cables includes a microwelder, an anvil which acts as a heat sink and supports a flexible flat ribbon cable that is to be connected to a multiple pin connector. The microwelder is made from a modified commercially available resistance welding machine such as the Split Tip Electrode microwelder which consists of two separate electrode halves with a removable dielectric spacer in between. The microwelder is not used to "weld" the items together, but to provide a controlled compressive force on, and energy pulse to, a solder pre-form placed between a pin of the connector and a conductor of the flexible flat ribbon cable. When the microwelder is operated, an electric pulse will flow down one electrode, through the solder pre-form and back up the other electrode. This pulse of electrical energy will cause the solder pre-form to heat-up and melt, joining the pin and conductor.

8 Claims, 3 Drawing Sheets

HIGH TEMPERATURE SOLDER DEVICE FOR FLAT CABLES

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to soldering devices and particularly to a solder device useful for soldering multi-pin connectors to thin fragile flat ribbon cables using high temperature/high thermal fatigue solders.

BACKGROUND ART

Various soldering devices and techniques are known in the prior art. One particular application of the joining of two items by soldering is the connection of miniature and subminiature connectors to very thin flat flexible cables. In this application, conventional soldering techniques have been limited to the low to intermediate temperature solders. Fabrication temperatures are restricted to around 180° C. or less to prevent damage to the plastic insulation on the thin flat cables. This restriction precludes the use of the higher melting temperature solders with correspondingly greater thermal fatigue resistance. Presently, connections to flat cables are made using conventional soldering techniques using Eutectic 63 SN, 37 Pb solder, which has a melting point of around 183° C. This solder has low thermal fatigue resistance, and failures have been known to occur at only several thousand cycles at moderate −40° to +40° C. low cyclic conditions. For example, on one item of space hardware, solar array panels exhibited solder fatigue after only 10,000 thermal cycles. This is of great concern when fabricating hardware for use in outer space. The anticipated temperatures in this environment for many orbital platforms may range from −40° C. to +115° C. at 5,000 cycles per year for thirty years, or 150,000 cycles. The hundreds to thousands of solder connections required in this type of hardware requires a high reliability solder technique. In addition, each orbit in and out of the sun will produce wide temperature swings further exacerbating the thermal stresses placed on these connections.

STATEMENT OF THE INVENTION

It is therefore an object of the present invention to provide a device for soldering connectors to thin flat cables, using high temperature solder, without damaging the cable materials.

A further object of the invention is to improve the thermal fatigue life of solder connections made on flat cables.

A still further object is to increase the reliability of soldered connections for outer space applications.

The foregoing objects are achieved by providing a device that will allow the use of solder alloys that have superior thermal fatigue resistance. The present inventive device carefully controls the heat zone and solder quantity, allowing the use of alloys with higher melting temperatures. By limiting, confining, and carefully controlling the energy pulse to the heat affected zone on a microscopic scale, it will allow soldering with these high temperature solders. This is accomplished through the combined use of shaped electrodes, carefully selecting the gap between the electrodes, proper selection and placement of a solder preform, controlling the applied force on the connector/solder preform/conductor sandwich, selection of electrode material, and a controlled applied electrical pulse. In addition, a heat-sinked anvil further protects the thin plastic insulation of flexible ribbon cable. With improved thermal resistance, electrical reliability will be improved for hardware that is exposed to cyclic temperatures in spacecraft, aircraft, and other severe applications.

DETAILED DESCRIPTION OF THE INVENTION

Figure 1:
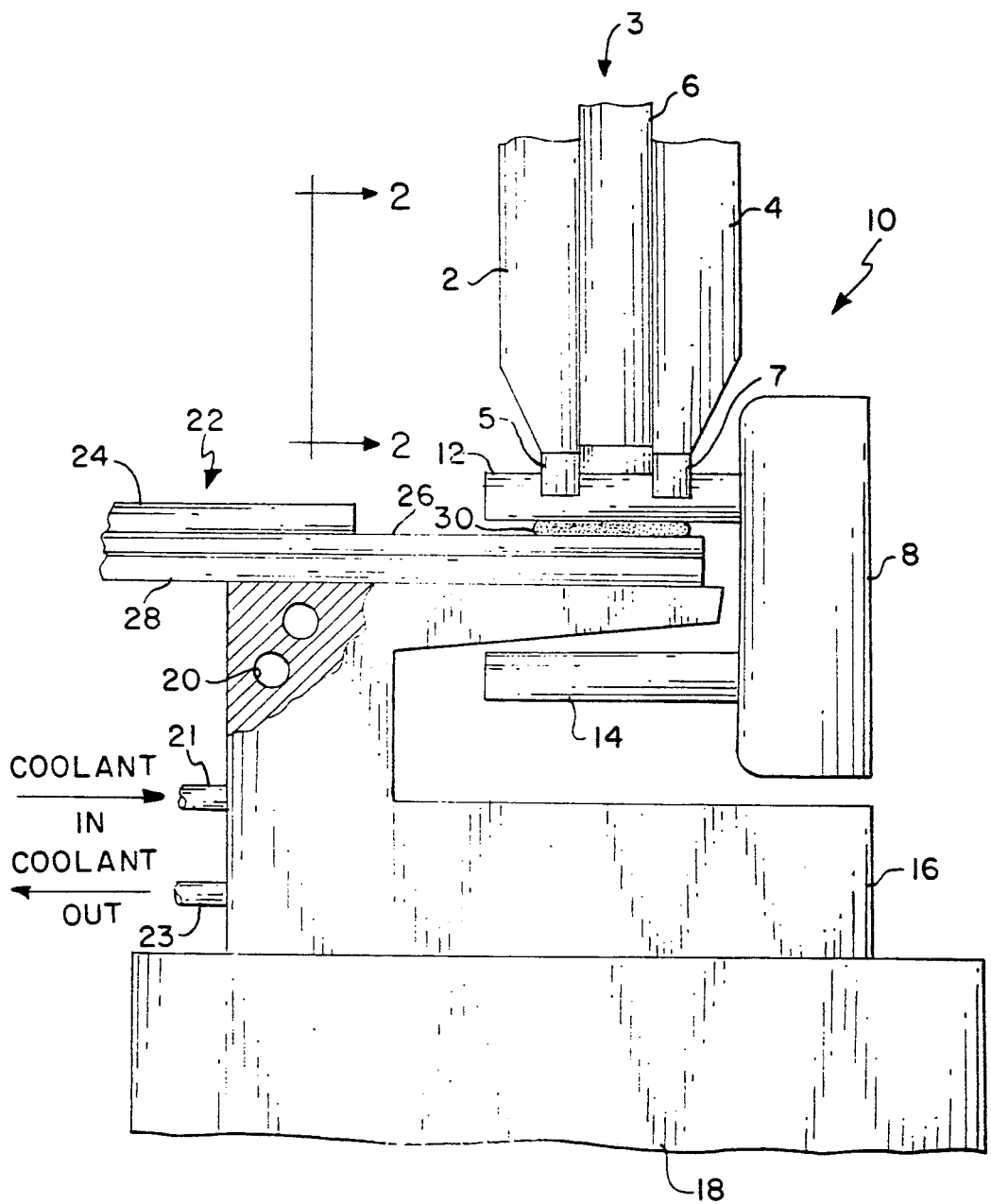
FIG. 1 is a front view of a High Temperature Solder Device for Flat Cables according to the present inventive concepts.

Referring now to FIG. 1, a High Temperature Solder Device for Flat Cables according to the present inventive concepts is shown generally by reference numeral 10. Device 10 includes a microwelder 3 (only the electrodes are shown), an anvil 16, which is a heat sink and also supports a flexible flat ribbon cable 22 that is to be connected to a subminiature multiple pin connector 8.

Microwelder 3 is constructed from a modified commercially available resistance welding machine. As those skilled in the art will recognize, resistance welding is a general term for a group of methods for joining metals together electrically. In resistance welding, a low voltage forces a high-density current for a relatively short time through an area covered by the welding electrodes. A mechanical force must be applied to the electrodes before, during, and after the time the current flows in order to produce the proper conditions for heating and forging the metals together. In a typical resistance welder, the welding current flows from a transformer through an electrode of the welder, the workpiece, the other electrode, and back to the transformer. Open-circuit secondary voltage necessary to produce the welding current is determined by the impedance of the secondary circuit. When this voltage is multiplied by the welding current the demand kilovolt-amperes (kva) of the welding transformer is obtained. Because the welding current flows for a small part of the total time, the demand kva rating is greater than the thermal rating. Total heat H generated in the workpiece and electrodes is expressed in watt-seconds and is given by the equation $H = I^2 RT$ where I is the current in amperes, R is the sum of contact and workpiece resistances measured between the electrodes, and T is the time in seconds.

An example of a suitable resistance welder for use in the present invention is the Split Tip Electrode microwelder made by WELTEK, which consists of two separate electrode halves, electrode 2 and electrode 4, with a removable dielectric spacer 6 between, which is joined by Nylon screws. The size of the gap between electrode 2 and electrode 4 is determined by the thickness of the dielectric spacer 6 used. In the WELTEK microwelder 3, the electrode gap can be easily changed from 0.001" up to 0.025". The WELTEK model numbers are 310-SP, 410-D, 410-DVP and the 410-E.

In the present invention, microwelder 3 is not used to "weld" two items together, but to provide a controlled compressive force on, and electrical pulse to, a solder pre-form or solder paste 30, which is placed between pin 12 of subminiature multiple pin connector 8 and conductor 26 of flexible flat ribbon cable 22. When microwelder 3 is operated, an electric pulse will flow down electrode 2, through shaped electrode tip 5, through pin 12, through solder pre-form 30 and conductor 26, back through pin 12 to shaped electrode tip 7, and up electrode 4. This pulse of electrical energy will cause solder pre-form 30 to heat-up and melt, joining pin 12 to conductor 26. Microwelder 3 is then moved to the next pin 12 and the above steps are repeated on all the pins on the top row of connector 8. The subminiature multiple pin connector 8 can then be flipped over so the bottom row of pins (pins 14) can be joined to a second flexible flat ribbon cable in the same manner that the top row of pins 12 were joined.

By carefully selecting the resistance welding parameters to produce the proper amount of energy to solder pre-form 30, pin 12 can be safely and securely soldered to conductor 26 without damage to flexible cable 22. The welding parameters need to be carefully selected and controlled as flexible flat ribbon cable 22 is fragile. Typically, cable 22 is made from flexible plastic (Kapton or Mylar) insulation 24 and 28 on either side of multiple copper conductors 26 with are generally 0.050" wide by 0.002" thick. The ribbon cable widths vary from about one inch to several inches. In the past, excessive heat used to solder pin 12 to conductor 26 has caused delamination of conductor 26 and/or damage to insulators 24 and 28.

Prior to the soldering of connectors to cables, microwelder 3 settings would be determined using an iso-strength diagram to determine optimum conditions for a particular set of cables and connectors. Samples would be made at selected settings and tensile tested. A graph of electrode compressive force versus power setting would be made recording the tensile test results on the graph. The settings would be varied until results indicated good tensile strengths. Thermocouple measurements and electrode electrical pulses would be recorded to produce records and to monitor the soldering process. Settings would vary depending on the configuration and particularly on the selected solder pre-form 30.

In order to protect the plastic insulation 24 and 28 of the flexible flat ribbon cable 22, anvil 16, sitting on base 18 (e.g., a table) is used not only to position and support cable 22 but to provide a heat sink during the solder operation. Anvil 16 can also shaped to accommodate different connector 8 configurations, and can be provided with a cooling medium such as water or air through intake 21, voids 20, and outflow 23, if necessary. Anvil 16 will then act like a radiator to remove the heat during the soldering operation. Anvil 16 would typically be made from aluminum or any other metal with good (high) thermal conductivity.

A principal advantage of the present invention is that it will allow the use of solder alloys with greater thermal fatigue resistance. This is accomplished by providing a precise method for controlling the heat input to the parts being soldered. Solders that could not be used in the prior art can now be used effectively without damage to the fragile flat ribbon cable 22. High thermal fatigue solders such as the Indium alloys, Silver alloys, etc. can now be used. Typical high temperature solders are listed in table I below.

TABLE I

| COMPOSITION | LIQUIDUS |
| --- | --- |
| 92.5 Pb, 5 In, 2.5 Ag | 310° C. |
| 95 Sn, 5 Sb | 240° C. |
| 97.5 Pb, 1.5 Ag, 1 Sn | 309° C. (Eutectic) |
| 60 Pb, 40 In | 231° C. |
| 50 In, 50 Pb | 210° C. |
| 96.5 Sn, 3.5 Ag | 221° C. (Eutectic) |

Figure 2A:
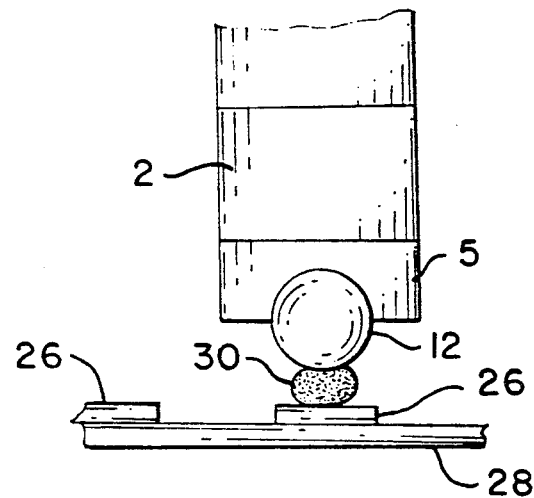
FIGS. 2a and 2b are enlarged views of the shaped electrode tips used in the present invention.
Figure 2B:
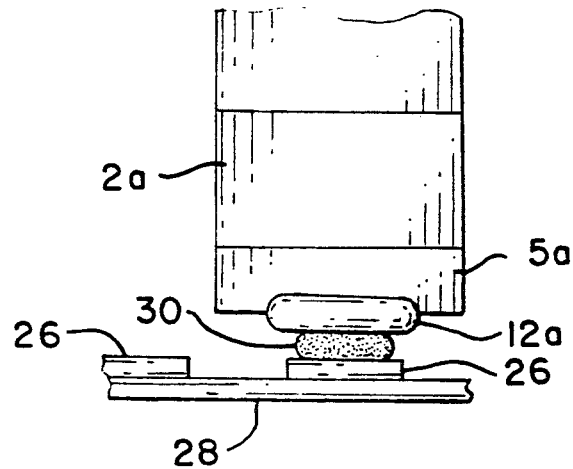

In order to properly control the flow of electricity through solder pre-form 30, the shape of electrode tips 5 and 7 should conform to the shape of pin 12. This is shown in FIGS. 2a and 2b which are views of the electrode tips from view 2—2 of FIG. 1. In FIG. 2a, pin 12 is a round pin, typically having a diameter of 0.050", and therefore electrode tip 5 on electrode 2 has a semicircular shape to conform to pin 12. In FIG. 2b, pin 12a has an elongated or flattened shape and electrode tip 5a on electrode 2a is likewise shaped to conform to this type pin. In the WELTEK microwelder, a wide selection of materials is available for electrode tips 5 and 7, such as molybdenum; the selection of material will depend upon the particular resistance parameter required. Also, tips 5 and 7 do not come shaped from the manufacturer for any particular connector; shaping must be done separately.

Figure 3:
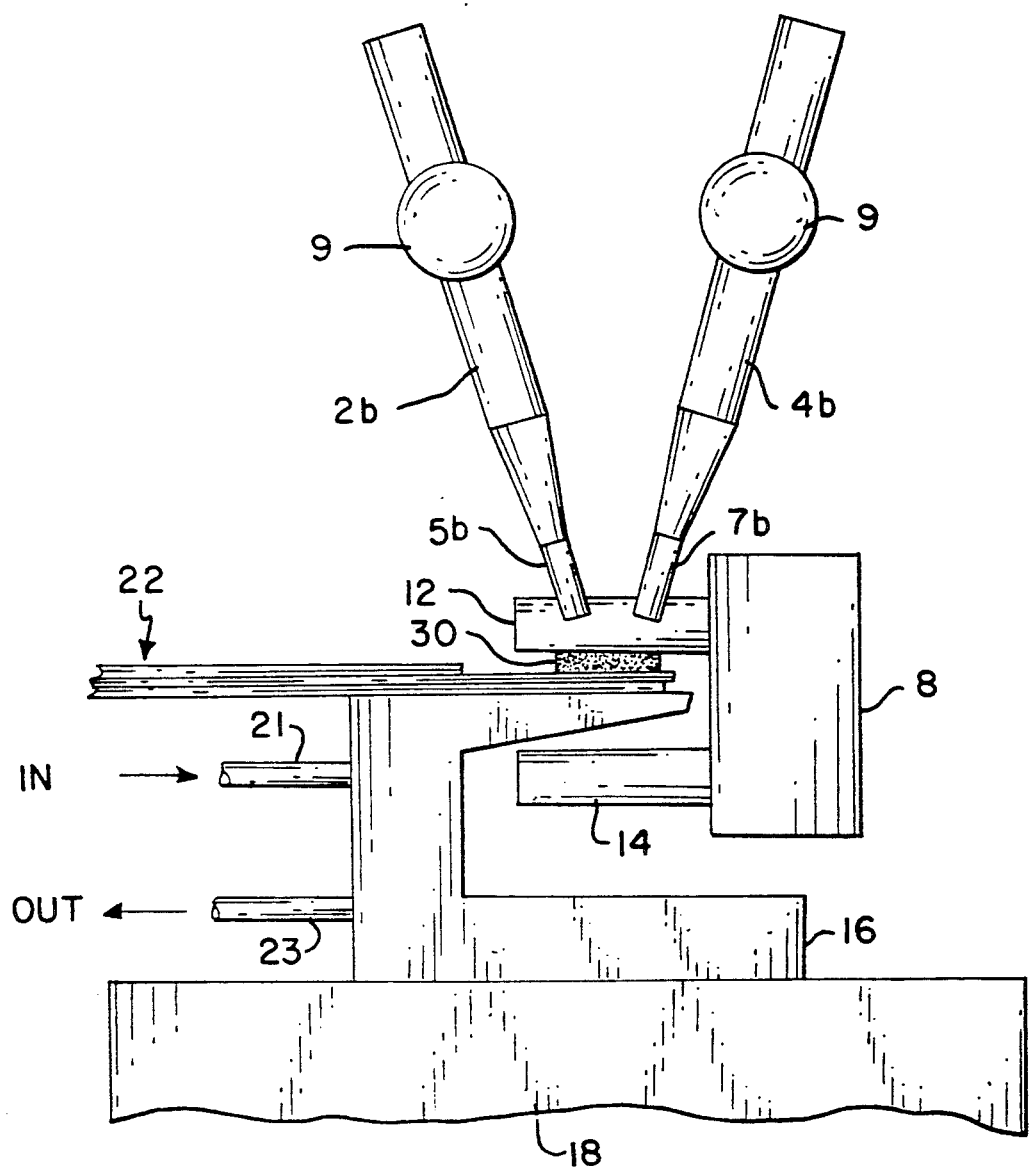
FIG. 3 is an alternate embodiment of the High Temperature Solder Device for Flat Cables.

An alternate embodiment of the High Temperature Solder Device is shown in FIG. 3. In this embodiment, all elements remain the same as FIG. 1 except for electrodes 2b and 4b and their associated shaped electrode tips 5b and 7b. In this embodiment, electrodes 2b and 4b are held apart by clamps 9, which allows electrodes 2b and 4b to be angled towards each other as shown, or away from each other as not shown. This configuration may prove advantageous for some applications.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A device for soldering multi-pin connectors to thin fragile flat ribbon cables having a plurality of conductors using high temperature/high thermal fatigue solders comprising:

electrode means having a first half and a second half, the tips of said electrode means halves conforming to the shape of said pins of said multi-pin connector;

solder means having a melting temperature above 200° C. and a high thermal fatigue characteristic between said pins of said multi-pin connector and said conductors of said flat ribbon cable;

heat sink means comprising an anvil made from a material having high thermal conductivity for supporting said thin fragile flat ribbon cables having a plurality of conductors such that said electrode means can apply a downward compressive force on said pins of said multi-pin connector and said conductors of said flat ribbon cable;

means for applying a short duration, high density, electrical pulse of energy through said solder means between said pins of said multi-pin connector and said conductors of said flat ribbon cable thereby melting said solder without excessive heat and joining said pins of said multi-pin connector and said conductors of said flat ribbon cable without damage to said thin fragile flat ribbon cable.

2. The device of claim 1 wherein said means for applying a short duration, high density, electrical pulse of energy through said solder means comprises a resistance welding machine.

3. The device of claim 1 wherein said electrode means first and second half are separated by a dielectric material between said electrode means first and second half.

4. The device of claim 1 wherein said electrode means first and second half are separated by providing a clamp means on each electrode means first and second half such that said electrode means first and second half may be tilted toward or away from each other.

5. The device of claim 1 wherein said anvil contains voids within and means for circulating a coolant through said voids.

6. The device of claim 5 wherein said coolant is water.

7. The device of claim 5 wherein said coolant is air.

8. A method for soldering multi-pin connectors to thin fragile flat ribbon cables having a plurality of conductors using high temperature/high thermal fatigue solders comprising the steps of:

1) providing a heat sink having a flat surface;
2) exposing a portion of the conductors of said flat ribbon cable and positioning said flat ribbon cable on said flat surface with said exposed portion of said conductors facing upward;
3) positioning the pins of said multi-pin connector above said exposed portion of said conductor in a manner such that each pin of said multi-pin connector is above a corresponding exposed conductor of said flat ribbon cable;
4) placing a suitable amount of solder having a melting temperature above 200° C. and also a high thermal fatigue characteristic between the first pin of said multi-pin connector and its corresponding exposed conductor;
5) providing a downward compressive force on said first pin of said multi-pin connector with an electrode having a first half and a second half, the tips of said electrode halves conforming to the shape of said pins of said multi-pin connector;
6) providing a short duration, high density, electrical pulse of energy through said solder by sending an electrical current down said first half of said electrode and back up said second half of said electrode thereby melting said solder without excessive heat and joining said first pin of said multi-pin connector to its corresponding exposed conductor without damage to said flat ribbon cable;
7) repeating steps 4 through 6 until all pins of said multi-pin connector are soldered to their corresponding exposed conductors.

* * * * *